United States Patent
Fukuda et al.

(10) Patent No.: US 12,485,252 B2
(45) Date of Patent: Dec. 2, 2025

(54) GUIDE WIRE

(71) Applicant: TERUMO KABUSHIKI KAISHA, Tokyo (JP)

(72) Inventors: Takumi Fukuda, Fujinomiya (JP); Fuminori Sugiyama, Fujinomiya (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 842 days.

(21) Appl. No.: 17/835,477

(22) Filed: Jun. 8, 2022

(65) Prior Publication Data

US 2022/0296861 A1 Sep. 22, 2022

Related U.S. Application Data

(63) Continuation of application No. PCT/JP2021/007653, filed on Mar. 1, 2021.

(30) Foreign Application Priority Data

Mar. 30, 2020 (JP) ................. 2020-061404

(51) Int. Cl.
*A61M 25/09* (2006.01)
*B23K 20/00* (2006.01)
(Continued)

(52) U.S. Cl.
CPC ........... *A61M 25/09* (2013.01); *B23K 20/004* (2013.01); *B23K 20/22* (2013.01); *C22C 19/03* (2013.01);
(Continued)

(58) Field of Classification Search
CPC ........ A61M 25/09; A61M 2025/09191; B23K 20/004; B23K 20/0028; B23K 20/08
See application file for complete search history.

(56) References Cited

U.S. PATENT DOCUMENTS 9,033,004 B2 * 5/2015 Mishima ............... A61M 25/09
600/585
2006/0235336 A1 10/2006 Tano et al.
(Continued)

FOREIGN PATENT DOCUMENTS

| CN | 1846803 A | 10/2006 |
|---|---|---|
| CN | 106460098 A | 2/2017 |

(Continued)

OTHER PUBLICATIONS

The extended European Search Report issued Feb. 3, 2023, by the European Patent Office in corresponding European Patent Application No. 21781029.0-1103. (7 pages).

(Continued)

*Primary Examiner* — Nathan R Price
(74) *Attorney, Agent, or Firm* — Buchanan Ingersoll & Rooney PC

(57) ABSTRACT

A guide wire with improved joining strength is provided. The guide wire includes a first wire and a second wire are solid-phase-joined to each other, the first wire and the second wire are made of a Ni—Ti-based alloy. When a section of a crystal grain size is 1 μm in a number-based particle size distribution of crystal grains of a metallographic structure of a joint surface between the first wire and the second wire, the frequency of the crystal grains having a mode particle size is 25% or more and the frequency of the crystal grains having a crystal grain size with a representative diameter of (mode particle size (μm)−1 μm) or more and (mode particle size (μm)+1 μm) or less is 60% or more.

20 Claims, 4 Drawing Sheets

(51) Int. Cl.
*B23K 20/22* (2006.01)
*C22C 19/03* (2006.01)
*B23K 101/32* (2006.01)
*B23K 103/08* (2006.01)

(52) U.S. Cl.
CPC ............. *A61M 2025/09075* (2013.01); *A61M 2025/09083* (2013.01); *A61M 2025/09108* (2013.01); *A61M 2025/09133* (2013.01); *B23K 2101/32* (2018.08); *B23K 2103/08* (2018.08)

(56) References Cited

U.S. PATENT DOCUMENTS

| | | |
|---|---|---|
| 2008/0161726 A1 | 7/2008 | Itou |
| 2008/0281396 A1* | 11/2008 | Ishida .................. A61L 31/022 623/1.11 |
| 2012/0310218 A1 | 12/2012 | Mishima et al. |
| 2013/0091686 A1 | 4/2013 | Murayama et al. |
| 2014/0200555 A1 | 7/2014 | Simpson et al. |
| 2014/0288533 A1 | 9/2014 | Tano et al. |
| 2015/0044496 A1 | 2/2015 | Oshima et al. |
| 2016/0279391 A1 | 9/2016 | Gupta et al. |
| 2016/0376688 A1 | 12/2016 | Fujii et al. |

FOREIGN PATENT DOCUMENTS

| | | |
|---|---|---|
| JP | 4734029 B2 | 4/2011 |
| JP | 2013-198924 A | 10/2013 |
| JP | 5985849 B2 | 8/2016 |
| JP | 2017113267 A | 6/2017 |
| WO | 2013100045 A1 | 7/2013 |

OTHER PUBLICATIONS

Office Action (The First Office Action) issued Mar. 1, 2023, by the National Intellectual Property Administration, P. R. China in corresponding Chinese Patent Application No. 202180026078.9 and an English translation of the Office Action. (10 pages).

English Translations of the International Search Report (Form PCT/ISA/210) and the Written Opinion of the International Searching Authority (Form PCT/ISA/237) issued Apr. 20, 2021, by the Japan Patent Office in corresponding International Application No. PCT/JP2021/007653. (5 pages).

International Search Report (PCT/ISA/210) with translation and Written Opinion (PCT/ISA/237) mailed on Apr. 20, 2021, by the Japan Patent Office as the International Searching Authority for International Application No. PCT/JP2021/007653. (8 pages).

* cited by examiner

FIG. 6

| | Example 1 | Example 2 | Comparative Example 1 | Comparative Example 2 |
|---|---|---|---|---|
| Deformation amount (mm) (average value of n = 15) | 1.34 | 1.09 | 1.09 | 0.98 |
| Joining strength (N) (average value of n = 10) | 375 | 319 | 280 | 284 |
| Mode particle size (μm) | 2.5 | 1.5 | 2.5 | 1.5 |
| Frequency (%) of crystal grains having mode particle size | 28.9 | 28.4 | 23.7 | 33.1 |
| Frequency (%) of crystal grains having crystal grain size of (mode particle size (μm) − 1 μm) or more and (mode particle size (μm) + 1 μm) or less | 68.7 | 62.3 | 64.2 | 59.4 |
| Hardness | 256.06 | 287.65 | 278.39 | 224.19 |
| Standard deviation of hardness | 8.24 | 14.12 | 14.70 | 18.18 |

TABLE 1

GUIDE WIRE

CROSS-REFERENCES TO RELATED APPLICATIONS

This application is a continuation of International Application No. PCT/JP2021/007653 filed on Mar. 1, 2021, which claims priority to Japanese Application No. 2020-061404 filed on Mar. 30, 2020, the entire content of both of which is incorporated herein by reference.

TECHNOLOGICAL FIELD

The present disclosure relates to a guide wire.

BACKGROUND DISCUSSION

A guide wire is an elongated medical appliance that is inserted into a blood vessel so that a catheter or a stent for intravascular treatment can be guided to a target position.

The guide wire is required to travel through a complex curved or bifurcated portion of the blood vessel and pass through a stenosed site. Accordingly, the guide wire is required to be low in flexural rigidity for blood vessel selectivity and safety improvement on the side of intravascular insertion (distal side) and high in flexural rigidity in order to ensure pushing performance and torque transmission performance on the side where an operator performs operation (proximal side). Guide wires are known in which one core wire is formed by joining wires made of metals having different thicknesses and material properties such that the distal and proximal sides thereof have different properties (e.g., International Publication No. 2013/100045).

In traveling through a blood vessel, the guide wire is curved in the shape of the blood vessel. An operator pushes, pulls, and rotates the guide wire when the guide wire passes through a stenosed site. Accordingly, the guide wire in which the metallic wires are joined needs to have a sufficient joining strength in the joint portion. If the joining strength of the guide wire is insufficient, the guide wire has the risk of bending in the joint portion during intravascular use.

SUMMARY

A guide wire is disclosed with improved joining strength.

A guide wire is disclosed where a first wire and a second wire are solid-phase-joined to each other. The first wire and the second wire are made of a nickel-titanium-based (Ni—Ti-based) alloy. When a section of a crystal grain size is 1 μm in a number-based particle size distribution of crystal grains of a metallographic structure of a joint surface between the first wire and the second wire, a frequency of a mode particle size is 25% or more and a frequency of a representative diameter being (mode particle size (μm)−1 μm) or more and (mode particle size (μm)+1 μm) or less is 60% or more.

A guide wire is disclosed comprising: a first wire; a second wire solid-phase joined to the first wire; and when a section of a crystal grain size is 1 μm in a number-based particle size distribution of crystal grains of a metallographic structure of a joint surface between the first wire and the second wire, a frequency of a mode particle size is 25% or more and a frequency of a representative diameter being (mode particle size (μm)−1 μm) or more and (mode particle size (μm)+1 μm) or less is 60% or more.

A method is disclosed of forming a guide wire, the method comprising: solid-phase joining a first wire and a second wire to each other such that a section of a crystal grain size is 1 μm in a number-based particle size distribution of crystal grains of a metallographic structure of a joint surface between the first wire and the second wire, a frequency of a mode particle size is 25% or more and a frequency of a representative diameter being (mode particle size (μm)−1 μm) or more and (mode particle size (μm)+1 μm) or less is 60% or more.

According to the disclosure, the joining strength of a joint portion can be improved in the guide wire having the joint portion where the first wire and the second wire are joined. Accordingly, the guide wire is capable of reducing the risk of intravascular bending.

BRIEF DESCRIPTION OF THE DRAWINGS

FIG. 6 is a table (Table 1) showing the amount of deformation, the joining strength, the mode particle size, the frequency of crystal grains having the mode particle size, the frequency of crystal grains having a crystal grain size with a representative diameter of (mode particle size (μm)−1 μm) or more and (mode particle size (μm)+1 μm) or less, the hardness, and the standard deviation of hardness regarding each of Examples 1 and 2 and Comparative Examples 1 and 2.

DETAILED DESCRIPTION

Figure 1:
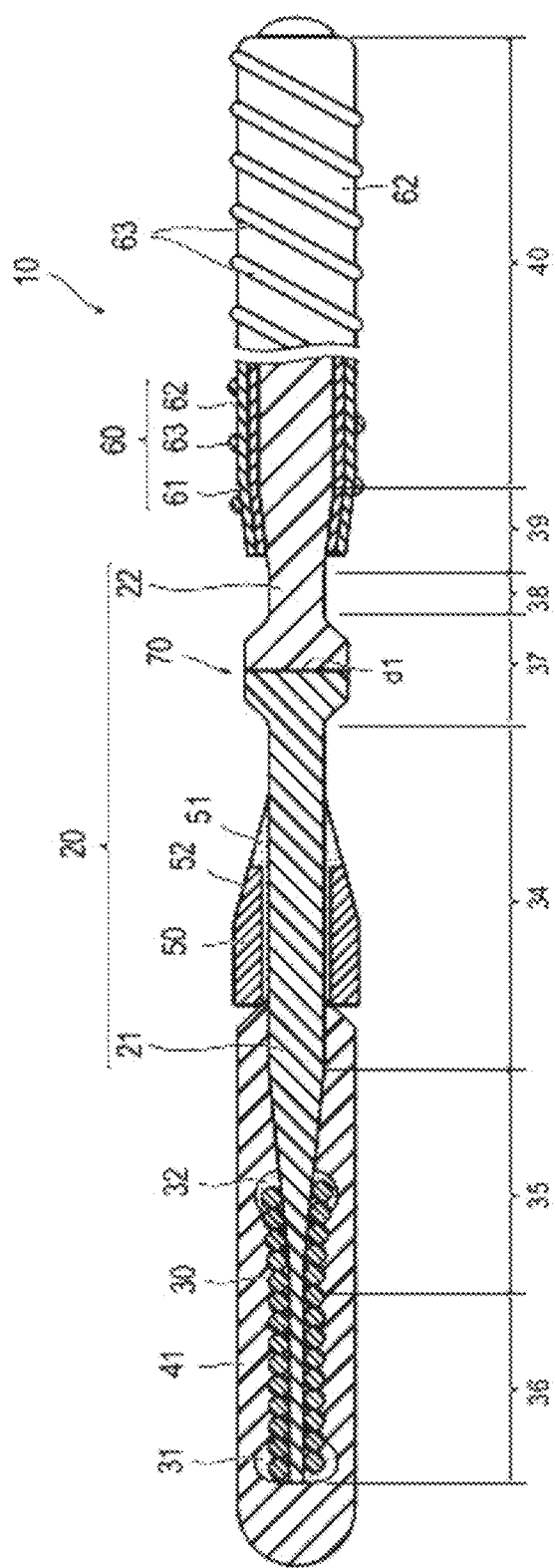
FIG. 1 is a partial vertical cross-sectional view illustrating a guide wire (cross-sectional view along the longitudinal axis direction of the guide wire) in accordance with an embodiment.
Figure 2:
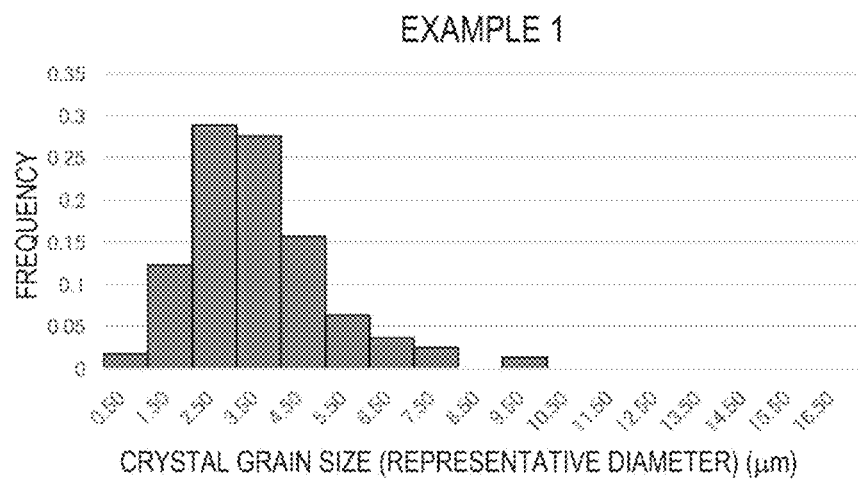
FIG. 2 is a diagram illustrating the particle size distribution of Example 1.
Figure 3:
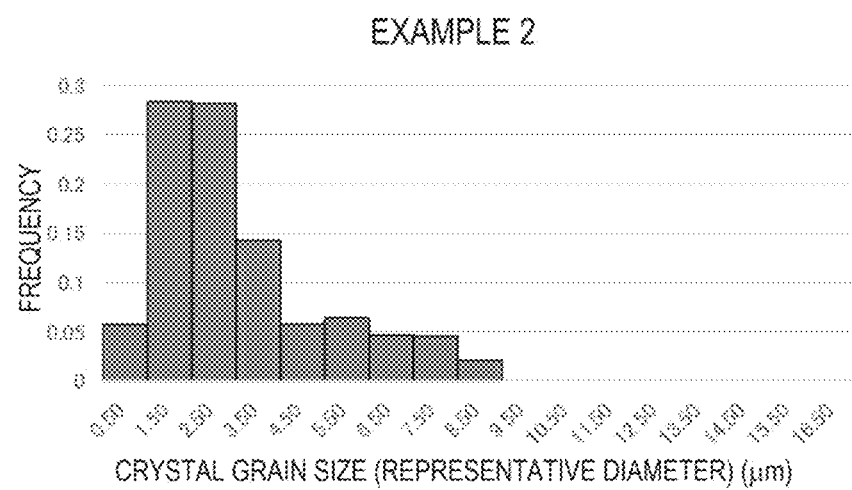
FIG. 3 is a diagram illustrating the particle size distribution of Example 2.
Figure 4:
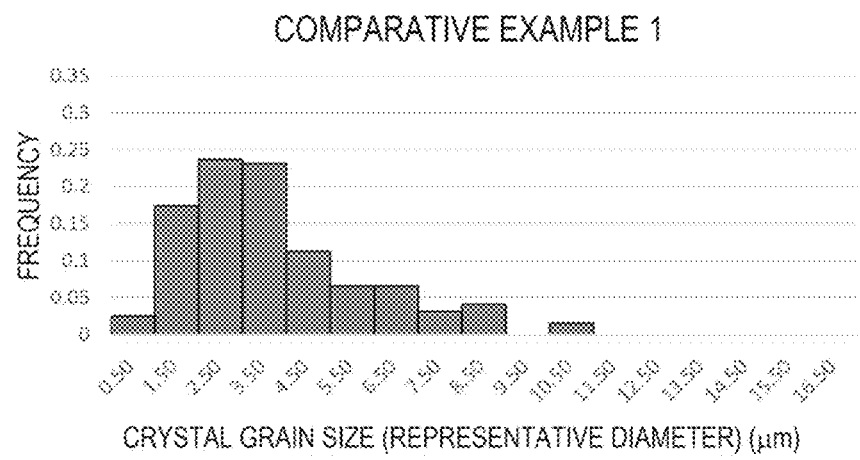
FIG. 4 is a diagram illustrating the particle size distribution of Comparative Example 1.
Figure 5:
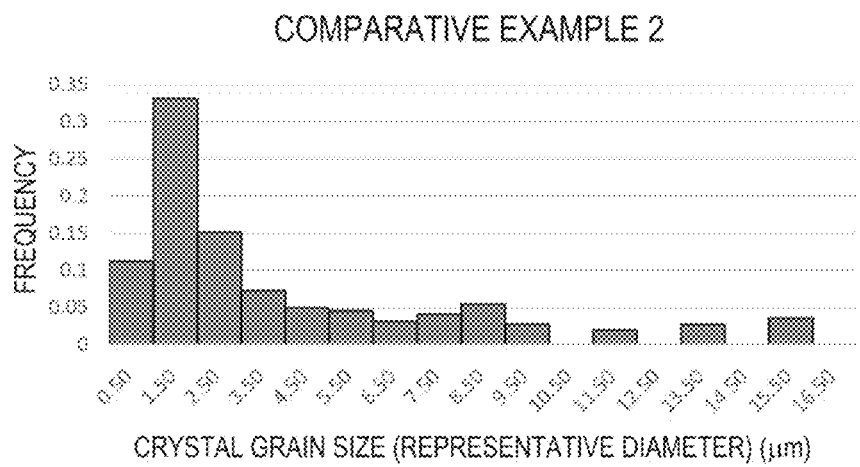
FIG. 5 is a diagram illustrating the particle size distribution of Comparative Example 2.

Set forth below with reference to the accompanying drawings is a detailed description of embodiments of a guide wire. Note that since embodiments described below are preferred specific examples of the present disclosure, although various technically preferable limitations are given, the scope of the present disclosure is not limited to the embodiments unless otherwise specified in the following descriptions. In the description of the drawings, the same elements are denoted by the same reference numerals with redundant description omitted. In addition, the dimensional ratios in the drawings are exaggerated for convenience of description and may differ from the actual ratios.

In the description of the present specification, the direction in which a guide wire extends in a natural state (straight state without external force application) is a "longitudinal axis direction" or "major axis direction". In a horizontal cross section of the guide wire with the longitudinal axis direction of the guide wire as a reference axis (axially orthogonal cross section), the direction toward or away from the guide wire is "radial direction". The direction of rotation with the longitudinal axis direction of the guide wire as a reference axis is "circumferential direction". In addition, the side of the guide wire inserted into a blood vessel is the distal side of the guide wire and the end portion side opposite to the distal side is the proximal side of the guide wire. In addition, "distal portion" is a part including a certain range in the longitudinal axis direction from the distal end (most distal end) and "proximal portion" is a part including a certain range in the longitudinal axis direction from the proximal end (most proximal end).

In the present specification, "X to Y" indicating a range that includes X and Y and means "X or more and Y or less".

Guide Wire

FIG. 1 is a vertical cross-sectional view of a guide wire 10 in accordance with an embodiment.

The guide wire 10 can be inserted into a blood vessel and used to guide a catheter to a target site in the blood vessel in a state of being inserted through the lumen of the therapeutic or diagnostic catheter (guide wire lumen). As illustrated in FIG. 1, the guide wire 10 according to a first embodiment includes an axially stretching core wire 20, a coil 30 and a distal coating layer (corresponding to a resin coating layer) 41 disposed in the distal portion of the core wire 20, a tubular member 50 disposed on the proximal side of the distal coating layer 41, and a proximal coating layer 60 disposed in the proximal portion of the core wire 20.

The length of the guide wire 10 along the longitudinal axis direction is not particularly limited. The length may be, for example, 200 mm to 5000 mm.

Core Wire

As illustrated in FIG. 1, the core wire 20 has a first wire 21 disposed on the distal side in the longitudinal axis direction and a second wire 22 disposed on the proximal side of the first wire 21. The first wire 21 and the second wire 22 are joined in a solid phase via a joint surface d1 in a joint portion 37. The joint portion 37 can have a protruding portion 70 protruding radially outward from the outer surface of the core wire 20.

The first wire 21 has a distal portion 36 disposed on the distal side of the first wire 21, a first constant outer diameter portion 34 disposed on the proximal side of the distal portion 36, and a first tapered portion 35 disposed between the distal portion 36 and the first constant outer diameter portion 34. The distal portion 36 extends from the distal end of the first wire 21 to the distal end of the first tapered portion 35 and has a substantially constant outer diameter along the longitudinal axis direction. The first tapered portion 35 extends from the proximal end of the distal portion 36 to the distal end of the first constant outer diameter portion 34 and has an outer diameter gradually increasing along the longitudinal axis direction. The first constant outer diameter portion 34 extends from the proximal end of the first tapered portion 35 to the distal end of the protruding portion 70 and has a substantially constant outer diameter along the longitudinal axis direction. The outer diameter of the first constant outer diameter portion 34 can be, for example, 0.6 mm to 0.8 mm.

The second wire 22 has a second constant outer diameter portion 38 disposed on the distal side of the second wire 22, a third constant outer diameter portion 40 disposed on the proximal side of the second constant outer diameter portion 38, and a second tapered portion 39 disposed between the second constant outer diameter portion 38 and the third constant outer diameter portion 40. The second constant outer diameter portion 38 extends from the proximal end of the protruding portion 70 to the distal end of the second tapered portion 39 and has a substantially constant outer diameter along the longitudinal axis direction. The outer diameter of the second constant outer diameter portion 38 is substantially equal to the outer diameter of the first constant outer diameter portion 34 of the first wire 21 and can be, for example, 0.6 mm to 0.8 mm. The second tapered portion 39 extends from the proximal end of the second constant outer diameter portion 38 to the distal end of the third constant outer diameter portion 40 and has an outer diameter gradually increasing along the longitudinal axis direction. The third constant outer diameter portion 40 extends from the proximal end of the second tapered portion 39 to the proximal end of the second wire 22 and has a substantially constant outer diameter along the longitudinal axis direction.

The core wire 20 can be formed by joining the first wire 21 and the second wire 22 in a solid phase. Each of the first wire 21 and the second wire 22 can be formed by grinding a metallic wire having a constant outer diameter. In accordance with an embodiment, the outer diameter of the second wire 22 that is yet to be ground is larger than the outer diameter of the first wire 21 that is yet to be ground. By forming the core wire 20 by grinding and then joining two wires different in outer diameter, the length that requires grinding is shorter than in a case where the core wire 20 is formed by grinding one wire. Accordingly, by joining two wires different in outer diameter, it is possible to rather easily manufacture the core wire 20 that has a low-flexural rigidity distal part and a high-flexural rigidity proximal part. In the core wire 20, the outer diameter (mm) at the position at 150 mm from the joint surface d1 to the proximal side can be, for example, 115% or more of the outer diameter (mm) at 150 mm from the joint surface d1 to the distal side.

In accordance with an embodiment, both the first wire 21 and the second wire 22 can have a substantially circular horizontal cross-sectional shape. It should be noted that the shapes of the first wire 21 and the second wire 22 are not limited to a substantially circular horizontal cross-sectional shape. For example, the first wire 21 and the second wire 22 may have other tapered or constant outer diameter portions between the distal portion 36 and the first constant outer diameter portion 34 of the first wire 21 and between the second constant outer diameter portion 38 and the third constant outer diameter portion 40 of the second wire 22. In addition, the horizontal cross-sectional shape of the distal portion 36 of the first wire may be, for example, rectangular.

In accordance with an embodiment, each of the first wire 21 and the second wire 22 can be, for example, made of a Ni—Ti-based alloy. The Ni—Ti-based alloy has superelasticity, and thus it is relatively easy to restore the original shape after stress unloading even in the case of deformation to a plastic deformation region attributable to stress application. Therefore, the guide wire 10 can be prevented from being plastically deformed and bent during use to reduce operability. In addition, when the first wire 21 and the second wire 22 of the core wire 20 are made of the same material, the change in physical properties from the first wire 21 to the second wire 22 including the joint portion 37 can be gradual, and thus it is relatively easy to obtain the joining strength of the joint portion 37. In addition, the physical properties of the first wire 21 and the second wire 22 can be similar to each other, and thus the plastic deformation in the event of solid-phase joining is similar between the first wire 21 and the second wire 22 and the shape of the joint portion 37 is substantially symmetrical with the joint surface as a plane of symmetry. As a result, when the guide wire 10 is subjected to a strong bending deformation, stress concentration on either the first wire 21 or the second wire 22 can be mitigated, and thus the joining strength against the bending deformation can be improved.

The Ni—Ti-based alloy can be represented by, for example, the following Formula (1):

$$Ni_xTi_yA_a \qquad \text{Chem 1}$$

In the above Formula (1), A is an unavoidable impurity. x, y, and a represent weight percent values. Satisfied in this case, for example, can be $30 \leq x \leq 70$, $30 \leq y \leq 70$, $0 \leq a \leq 1$, and x+y+a=100. More preferably, for example, 40≤x≤60, 40≤y≤60, 0≤a≤1, and x+y+a=100 can be satisfied in the Formula (1).

The joint portion 37 is the part of the core wire 20 that includes the joint surface d1 between the first wire 21 and the second wire 22 and the vicinity of the joint surface d1. The joint portion 37 is formed by performing solid-phase joining on the proximal surface of the wire forming the first wire 21 and the distal surface of the wire forming the second wire 22.

Solid-phase joining is a method for directly joining two metal materials. In solid-phase joining, a base metal is joined by plastic flow without melting. Solid-phase joining is performed at a temperature equal to or lower than a melting point, and a molten portion called a nugget is not formed on the joint surface. Accordingly, it is possible to suppress a significant difference between the material properties in the vicinity of the joint surface and the material properties of the base material. In other words, by performing solid-phase joining on the first wire 21 and the second wire 22 of the core wire 20, the change in material properties in the vicinity of the joint portion 37 that is viewed along the longitudinal axis direction is relatively small. Melt joining is another method for directly joining two metals. In melt joining, a plurality of base metals are joined by heat-melting and coagulating the base metals, and thus a nugget is formed on the joint surface. The nugget and the metal in the vicinity of the joint surface are degenerated from the base material by melting heat. Accordingly, the material properties in the vicinity of the joint surface may be significantly different from the material properties of the base material. Solid-phase joining and melt joining can be distinguished by checking the presence or absence of a nugget on the bimetallic joint surface with a scanning electron microscope.

In accordance with an embodiment, the joining of the first wire 21 and the second wire 22 in a solid phase is not particularly limited. Examples of the method of the joining of the first wire 21 and the second wire 22 can include friction joining, room-temperature pressure joining, high-temperature pressure joining, explosive joining, and electromagnetic pulse joining. Friction joining and high-temperature pressure joining are particularly preferable in joining small-outer diameter metallic wires such as the first wire 21 and the second wire 22. In these joining methods, the proximal surface of the first wire 21 and the distal surface of the second wire 22 are brought into pressure contact with each other in a state of abutting in the axial direction and heat is input to the portion where the two wires are in contact with each other. As a result, the first wire 21 and the second wire 22 are softened by the temperature of the vicinity of the contact portion rising. At the same time, the first wire 21 and the second wire 22 are compressed in the longitudinal axis direction and plastically deformed. The metal material in the vicinity of the contact portion between the first wire 21 and the second wire 22 is extruded radially outward as a result of the compression, and burrs corresponding in amount to the plastic deformation are formed on the joint surface d1. The heat input is stopped after the temperature of the contact portion is raised to an appropriate temperature, and then the temperature in the vicinity of the contact portion between the first wire 21 and the second wire 22 decreases and the solid-phase joining can be achieved. Heat may be input to the contact portion between the first wire 21 and the second wire 22 by, for example, generating frictional heat by rotating either the first wire 21 or the second wire 22 such that the central axis serves as an axis of rotation. By an alternative method, the contact portion between the first wire 21 and the second wire 22 is energized to generate Joule heat. The amount of heat input can be controlled by adjusting joining conditions such as pressure, rotation speed, current, and how long to apply the conditions. In general, a sufficient heat input amount in the initial stage of joining is required for joining strength improvement. However, at an excessively large heat input amount, the contact portion between the first wire 21 and the second wire 22 may undergo a decline in strength or melt due to a thermal effect. At an excessively small heat input amount, the contact portion between the first wire 21 and the second wire 22 is insufficiently softened and the plastic deformation does not occur sufficiently, which results in a decline in joining strength.

It is preferable that the proximal portion of the first wire 21 and the distal portion of the second wire 22 used in the joining process are given substantially the same outer diameter by processing such as grinding. With the first wire 21 and the second wire 22 abutting against each other, the positions of the two wires are unlikely to be misaligned on the joint surface d1, and thus the central axis of the core wire 20 (axis passing through substantially the center of the horizontal cross section of the core wire 20 and extending in the longitudinal axis direction) can be substantially straight. It should be noted that the central axis of the core wire 20 substantially coincides with the central axis of the guide wire 10.

The proximal surface of the first wire 21 used in the joining process is substantially perpendicular to the central axis of the first wire 21. The distal surface of the second wire 22 used in the joining process is substantially perpendicular to the central axis of the second wire 22. As a result, the proximal surface of the first wire 21 and the distal surface of the second wire 22 can be formed with relative ease. It should be noted that each of the proximal surface of the first wire 21 and the distal surface of the second wire 22 used in the joining process may be inclined with respect to a plane perpendicular to the central axis of the wire and may be concave or convex.

Preferably, the proximal surface of the first wire 21 and the distal surface of the second wire 22 are treated before the joining process for deposit and oxide film removal from each end surface. Examples of the treatment method may include polishing and acid treatment.

As a result of the solid-phase joining, the joint portion 37 is different in metallographic structure from the first constant outer diameter portion 34 of the first wire 21 and the second constant outer diameter portion 38 of the second wire 22 adjacent to the joint portion 37. In general, the metallographic structure observed in the first wire 21 and the second wire 22 that are yet to be joined is a fibrous structure parallel to the longitudinal axis direction of each wire are different in metallographic structure. When the first wire 21 and the second wire 22 are joined in a solid phase, the metallographic structure in the vicinity of the joint surface d1 is fine grained by the heat and pressure applied during the joining and a thermally affected portion is observed around the joint surface d1. Then, the fibrous metallographic structure changes or disappears in the direction along the direction of burr extrusion (outside in the radial direction) in the vicinity of the joint surface d1. In the present specification, when a vertical cross section including the central axis of the core wire 20 is macroscopically observed with a scanning electron microscope (at a magnification of approximately 1000 times), the part where the direction of the fibrous metallographic structure changes from the direction parallel to the longitudinal axis direction of the first wire 21 or the second wire 22 is the joint portion 37. The length of the joint portion 37 along the longitudinal axis direction is equal to the length of the thermally affected portion along the longitudinal axis direction.

The joint surface d1 is where the proximal surface of the first wire 21 and the distal surface of the second wire 22 are in contact with each other. In the present specification, in a case where the position where the first wire 21 and the second wire 22 are in contact with each other can be clearly identified in observing the metallographic structure of the vertical cross section of the core wire 20 with a scanning electron microscope, that position is the joint surface d1. In a case where the fibrous metallographic structure disappears as a result of solid-phase joining and the joint surface d1 cannot be clearly identified, the middle position of the joint portion 37 in the longitudinal axis direction of the core wire 20 is the joint surface d1.

The joint surface d1 formed as a result of the solid-phase joining is substantially perpendicular to the central axis of the core wire 20. In addition, it is preferable that the central axis of the first wire 21 and the central axis of the second wire 22 substantially coincide with each other on the joint surface d1 of the guide wire 10. It should be noted that the joint surface d1 may be inclined with respect to a plane perpendicular to the central axis of the core wire 20 and may be concave or convex.

The metallographic structure of the joint surface d1 and its vicinity greatly affects the joining strength of the first wire 21 and the second wire 22. In order to improve the joining strength of the first wire 21 and the second wire 22, it is preferable that the metallographic structure in the vicinity of the joint surface d1 is uniform. The size of the crystal grains of the metallographic structure correlates with metal hardness, and the hardness increases as the crystal grains decrease in size. Accordingly, on condition that the uniformity of the metallographic structure is low, local stress concentration attributable to a difference in hardness is likely to occur on the joint surface d1, which results in a decline in joining strength. In addition, as for the core wire 20 joined in a solid phase, the height of burrs generated in the joint portion 37 may be adjusted by mechanical polishing. At this time, the core wire 20 that has a low metallographic structural uniformity in the vicinity of the joint surface d1 is non-uniform in terms of hardness distribution on the joint surface d1, and thus an unintended unevenness is likely to occur on the outer surface after mechanical polishing. Such unevenness on the outer surface causes local stress concentration, which leads to a decline in the joining strength of the joint surface d1. In particular, on the joint surface d1 between metallic wires small in outer diameter as in the case of the guide wire 10, the unevenness of the outer surface can greatly affect the joining strength of the first wire 21 and the second wire 22.

The uniformity of the metallographic structure can be evaluated by the particle size distribution of the crystal grains of the metallographic structure. The particle size distribution of the crystal grains of the metallographic structure is obtained by dividing the crystal grains in any area (measurement target region) into several sections between the maximum diameter and the minimum diameter and measuring the number and area of the crystal grains in each section. As for the particle size distribution in the vicinity of the joint surface d1 in the present specification, a vertical cross section including the intersection of the central axis of the core wire 20 and the joint surface d1 is microscopically observed using a scanning electron microscope (at a magnification of approximately 5000 times) and the crystal grain size of the crystal grains in the measurement target region of the obtained image can be expressed as a number-based frequency distribution. The area of each crystal grain can be calculated from an image showing the grain boundary of the crystal grain using a crystal orientation-grain boundary microstructure automatic analysis device (OIM), and the crystal grain size can be calculated as the diameter in a case where it is assumed that each crystal grain is a true sphere, that is, a two-dimensional plane and a perfect circle. The measurement target region of the particle size distribution can be, for example, 0.075 mm×0.075 mm with the intersection of the central axis of the core wire 20 and the joint surface d1 at its center. The section of the crystal grain size in the particle size distribution can be, for example, 1.00 µm. In addition, the crystal grain size that corresponds to the median value of each section is the representative diameter of the section. In other words, in the particle size distribution, the frequency of crystal grains with a representative diameter, for example, of 0.05 µm indicates the ratio of the number of crystal grains more than 0 µm and 1.00 µm or less in measured crystal grain size value to the total crystal grain count in the measurement target region.

The size of the crystal grains of the metallographic structure correlates with hardness. Accordingly, the uniformity of the metallographic structure can also be evaluated by hardness distribution. In order to enhance the joining strength, it is preferable that the hardness of the metal in the vicinity of the joint surface d1 is uniform. The hardness in the present specification is a value obtained by measuring the test force and pushing depth during indenter pushing and converting a pushing hardness obtained from a load unloading curve into a Vickers hardness conversion value. The hardness of the joint surface d1 is a five-point average value measured with respect to the vertical cross section including the intersection of the central axis of the core wire 20 and the joint surface d1, and the five measurement points are the intersection and two at a position of 0.0625 mm and two at a position of 0.125 mm on the outer side in the radial direction along the joint surface d1 from the intersection. It should be noted that the hardness can be obtained, for example, to two decimal places.

In order to improve the joining strength of the first wire 21 and the second wire 22, it is preferable that the core wire 20 entails little change in hardness along the longitudinal axis direction from the first constant outer diameter portion 34 of the first wire 21 to the second constant outer diameter portion 38 of the second wire 22. Accordingly, it is preferable that the metallographic structure in the vicinity of the joint surface d1 has an appropriately large crystal grain size. The metallographic structure in the vicinity of the joint surface d1 is recrystallized and miniaturized by the heat and pressure during the solid-phase joining. At the same time, the hardness of the joint portion 37 positioned around the joint surface d1 is thermally affected to become lower than the hardness of the first wire 21 and the second wire 22 that are yet to be joined in a solid phase. Accordingly, on condition that the ratio of the fine crystal grains contained in the joint surface d1 is relatively high, the change in the hardness of the joint portion 37 in the vicinity of the joint surface d1 can be relatively large and local stress concentration is likely to occur on the joint surface d1 and at the boundary point of hardness change. As a result, a relatively large change in hardness along the longitudinal axis direction occurs from the first constant outer diameter portion 34 of the first wire 21 to the second constant outer diameter portion 38 of the second wire 22 of the core wire 20 and it can become difficult to improve the joining strength in a tensile test.

In the number-based particle size distribution of the crystal grains of the metallographic structure of the joint surface d1, the frequency of the mode particle size at a crystal grain size section of 1 μm can be, for example, 25% or more and more preferably 28% or more. The mode particle size is the representative diameter of the section that has the highest frequency in the particle size distribution (mode diameter). For example, by containing 25% or more of crystal grains with the mode particle size, the joint surface d1 can have a high metallographic structural uniformity. As a result, the joint surface d1 is unlikely to undergo local stress concentration attributable to a difference in physical properties and the joining strength is improved. In addition, although the upper limit of the frequency of the mode particle size can be 100% or less in the number-based particle size distribution of the crystal grains of the metallographic structure of the joint surface d1, the upper limit is usually, for example, 40% or less.

When the section of the crystal grain size is 1 μm in the number-based particle size distribution of the crystal grains of the metallographic structure of the joint surface d1, the frequency of the representative diameter being (mode particle size (μm)−1 μm) or more and (mode particle size (μm)+1 μm) or less can be, for example, preferably 60% or more and more preferably 62% or more. In other words, the total frequency of the frequency of the section having the mode particle size and the frequency of the two sections adjacent to the section having the mode particle size can be, for example, preferably 60% or more and more preferably 62% or more. The joint surface d1 having such a particle size distribution (i.e., for example, preferably 60% or more and more preferably 62% or more) has a higher metallographic structural uniformity. Accordingly, the joint surface d1 is even less likely to undergo local stress concentration attributable to a difference in physical properties and the effect of joining strength improvement further increases. In addition, although the upper limit of the frequency of the mode particle size can be, for example, 100% or less in the number-based particle size distribution of the crystal grains of the metallographic structure in the vicinity of the joint surface d1, the upper limit is usually, for example, 75% or less.

In the number-based particle size distribution of the crystal grains of the metallographic structure of the joint surface d1, the mode particle size, for example, is preferably 2.50 μm or more when the section of the crystal grain size is 1 μm. By reducing the ratio of fine crystal grains contained in the joint surface d1, the joint portion 37 is capable of reducing the change in hardness in the vicinity of the joint surface d1. As a result, in the core wire 20, the change in hardness along the longitudinal axis direction is relatively small from the first constant outer diameter portion 34 of the first wire 21 to the second constant outer diameter portion 38 of the second wire 22 and the joining strength is further improved in a tensile test. The upper limit of the mode particle size, for example, is preferably 5.50 μm or less and more preferably 3.50 μm or less. The hardness of the joint surface d1 does not significantly decrease by reducing the ratio of coarse crystal grains contained in the joint surface d1, and thus the joint surface d1 is capable of obtaining a relatively high joining strength.

The standard deviation of hardness at the joint surface d1, for example, is preferably 10.00 or less and more preferably 9.00 or less. It should be noted that the standard deviation of hardness is an unbiased standard deviation using five points measured at the joint surface d1 as samples and is obtained to two decimal places. By the standard deviation of hardness, for example, being 10.00 or less, the joint surface d1 has a relatively high metallographic structural uniformity. As a result, the joint surface d1 is unlikely to undergo local stress concentration attributable to a difference in physical properties and the joining strength can be improved. In addition, the joint surface d1 can be improved in terms of mechanical polishing workability. Although the lower limit of the standard deviation of hardness at the joint surface d1 is 0, the lower limit, for example, is usually 4.00 or more.

The metallographic structure of the joint surface d1 as described above can be obtained by appropriately controlling the amounts of heat input, heat radiation, and deformation in the contact portion between the first wire 21 and the second wire 22 in performing solid-phase joining. The amount of heat input and the amount of heat radiation affect the degrees of recrystallization and growth of the crystal grains in the vicinity of the joint surface d1. The amount of deformation during plastic deformation affects the degree to which the fine crystal grains resulting from the solid-phase joining remain in the vicinity of the joint surface d1. The amounts of heat input, heat radiation, and deformation can be controlled by adjusting various solid-phase joining conditions.

In a case where Joule heat is used for heat input to the contact portion between the first wire 21 and the second wire 22 in the solid-phase joining, the amounts of heat input, heat radiation, and deformation can be controlled by a current value and energization time because the Joule heat is a function of resistance, a current value, and energization time. In particular, in order to obtain a metallographic structure in which the joining strength of the joint surface d1 is relatively high in solid-phase joining between metallic wires small in outer diameter as in the case of the first wire 21 and the second wire 22, it is important to control the current value for a certain time from energization initiation to deformation initiation. When energization is started, Joule heat is generated in the contact portion due to the high contact resistance attributable to the fine unevenness on the proximal surface of the first wire 21 and the distal surface of the second wire 22. When the first wire 21 and the second wire 22 start to be deformed by the generated Joule heat, the fine unevenness is crushed as a result of the first wire 21 and the second wire 22 being in pressure contact with each other, the area of contact between the first wire 21 and the second wire 22 increases, and the contact resistance decreases. Accordingly, the amount of Joule heat generation decreases. Deformation occurs at the same time, and thus the area of contact between a joining device and the first wire 21 or the second wire 22 increases. Accordingly, the amount of heat radiation from the contact portion increases. In a case where a high current is applied in a short time in the initial stage of joining, the amount of heat input rapidly increases immediately after energization initiation, and yet the amount rapidly decreases subsequently because the deformation proceeds at a high speed. At the same time, a rapid increase in heat radiation amount attributable to the deformation also occurs. As a result, the temperature rise in the contact portion stops in a short time, and thus the amount of deformation decreases. In a case where a low current is applied for a long time, the amount of heat input attributable to energization is small, and thus the amount of deformation is small. In this manner, the current value for a certain time from energization initiation to deformation initiation affects both the amount of heat input and the amount of heat radiation and affects the amount of deformation as a result. From the transition of the amount of deformation, it could be estimated that it takes 5 milliseconds (ms) to reach the maximum temperature from energization initiation. Although the specific current value is appropriately set in view of, for example, the outer diameters and compositions of the first wire and the second wire, the current value at 5 ms from energization initiation, for example, is preferably 10 A to 1000 A and preferably more than 75 A and less than 300 A. As a result, the core wire 20 is capable of obtaining a metallographic structure in which the joining strength of the joint surface d1 between the first wire 21 and the second wire 22 is relatively high.

In a case where Joule heat is used as a method for heat input to the contact portion between the first wire 21 and the second wire 22, the pressure during pressure contact between the proximal surface of the first wire 21 and the distal surface of the second wire 22 is, for example, 50 MPa to 1000 MPa. If necessary, the pressure may be increased or decreased in the joining process.

In obtaining the metallographic structure of the joint surface d1 as described above, the amount of deformation, for example, is preferably 0.80 mm or more and more preferably 1.00 mm or more. The upper limit of the amount of deformation is not particularly limited, and examples of the upper limit can include 1.50 mm or less. It should be noted that the amount of deformation is the amount of displacement of the lengths of the first wire 21 and the second wire 22 in the longitudinal axis direction before and after solid-phase joining. At a small deformation amount, the joint surface d1 is likely to undergo a local increase in hardness as the remarkably fine crystal grains resulting from the solid-phase joining remain on the joint surface d1. On condition that the amount of heat is increased for an increase in deformation amount, the joint portion 37 is likely to be thermally affected to undergo a decline in hardness.

Protruding Portion

In the form of FIG. 1, the core wire 20 has the protruding portion 70 formed by mechanically polishing burrs on the joint surface d1 in the joint portion 37. The protruding portion 70 protrudes radially outward from the outer surface of the core wire 20. In other words, the outer diameter of the protruding portion 70 is larger than the outer diameter of the first constant outer diameter portion 34 of the first wire 21 disposed in the vicinity of the joint portion 37 and the outer diameter of the second constant outer diameter portion 38 of the second wire 22 disposed in the vicinity of the joint portion 37. The protruding portion 70 is formed in the joint portion 37 between the first wire 21 and the second wire 22, and thus the area of the joint surface d1 is large and the joining strength can be improved. In addition, by the outer diameter of the protruding portion 70 being larger than the adjacent portions of the first wire 21 and the second wire 22, it is possible to prevent the guide wire 10 from locally bending in the joint portion 37 in the event of simultaneous force application from both the distal portion and the proximal portion. The flexural rigidity of the guide wire 10 can be expressed by Young's modulus and the moment of inertia of area. As a result of solid-phase joining, the joint portion 37 is lower in hardness than the first constant outer diameter portion of the first wire 21 disposed in the vicinity of the joint portion 37 and the second constant outer diameter portion of the second wire 22 disposed in the vicinity of the joint portion 37. Assuming that the hardness and Young's modulus are in a direct proportional relationship, the flexural rigidity of the guide wire 10 decreases in the joint portion 37 in a case where the joint portion 37 is substantially equal in outer diameter to the first constant outer diameter portion 34 and the second constant outer diameter portion 38 of the second wire 22. Accordingly, only the joint portion 37 can be rather easily deformed when the guide wire 10 receives a compressive force in the longitudinal axis direction. By providing the protruding portion 70, the joint portion 37 is larger in outer diameter than the adjacent portions of the first wire 21 and the second wire 22 and the moment of inertia of area than the first constant outer diameter portion 34 and the second constant outer diameter portion 38 of the second wire 22. As a result, with the guide wire 10 having the protruding portion 70, it is possible to help suppress a decline in flexural rigidity in the joint portion 37 and help prevent the joint portion 37 from being deformed alone. As a result, with the guide wire 10, the torque and the pushing force that an operator applies to the proximal portion of the second wire 22 can be efficiently transmitted to the first wire 21.

The outer shape of the protruding portion 70 can be substantially trapezoidal in the vertical cross-sectional view of the guide wire 10. In addition, the joint surface d1 between the first wire 21 and the second wire 22 is positioned substantially at the center of the upper base (i.e., side parallel to the longitudinal axis) of the trapezoid. In other words, the joint surface d1 between the first wire 21 and the second wire 22 is positioned in the maximum outer diameter portion of the protruding portion 70. It should be noted that the outer shape of the protruding portion 70 in the vertical cross-sectional view of the guide wire 10 is not limited to the trapezoidal shape and the cross-sectional shape of the protruding portion 70 of the guide wire 10 may be a circular arc shape or a polygonal shape. In addition, the upper base of the trapezoidal shape of the protruding portion 70 observed in the vertical cross-sectional view of the guide wire 10 is not limited to a straight line and may be a curve.

The height of the protruding portion 70 is the distance between the maximum outer diameter portion of the protruding portion and the outer surface of the first constant outer diameter portion 34 of the first wire 21 or the second constant outer diameter portion 38 of the second wire 22. In a case where the outer shape of the protruding portion 70 in the vertical cross-sectional view of the guide wire 10 is trapezoidal, the height of the protruding portion 70 is the distance between the upper base of the trapezoid and the outer surface of the first wire 21 or the second wire 22 parallel to the upper base of the trapezoid and is preferably, for example, 0.001 mm to 0.200 mm and more preferably 0.020 mm to 0.100 mm.

The maximum outer diameter (mm) of the first wire 21 excluding the protruding portion 70 can be, for example, 90% to 100% of the maximum outer diameter (mm) of the protruding portion 70, and the maximum outer diameter (mm) of the second wire 22 excluding the protruding portion 70 can be, for example, 100% to 120% of the maximum outer diameter (mm) of the protruding portion 70.

Coil

The coil 30 is disposed so as to cover a certain range of the distal portion of the first wire 21. The coil 30 can be formed by spirally winding a wire around the first wire 21 and along the circumferential direction of the first wire 21. It is preferable that the coil 30 and the outer surface of the first wire 21 are in close contact with each other. In addition, it is preferable that the coil 30 is formed so as to have a gap between adjacent windings in a state where no external force is applied. It should be noted that the coil 30 may be formed so as to have no gap between adjacent windings in a state where no external force is applied.

It is preferable that the wire forming the coil 30 is formed of a radiopaque material. Examples of the radiopaque material can include metal materials such as precious metals (e.g. gold, platinum, and tungsten) and alloys containing the metals.

The distal end of the coil 30 is fixed to the distal portion of the first wire 21 by a fixing member 31. The proximal end of the coil 30 is fixed to the first tapered portion 35 of the first wire 21 by a fixing member 32. Examples of the material that forms the fixing member can include an adhesive, a brazing material, and solder.

Distal Coating Layer

The distal coating layer 41 can be made of a resin material and is formed so as to cover the distal portion of the core wire 20 including the coil 30. The distal portion of the distal coating layer 41 preferably has a rounded shape so as not to damage a blood vessel wall. In addition, the proximal portion of the distal coating layer 41 is positioned in the first constant outer diameter portion 34 of the core wire 20 (first wire 21).

The distal coating layer 41 is preferably formed of a highly flexible resin material. As a result, the distal side of the guide wire 10 is flexible and damage to an intravascular wall can be prevented. Examples of the resin material that forms the distal coating layer 41 can include polyolefin (e.g. polyethylene and polypropylene), polyvinyl chloride, polyester (e.g. PET and PBT), polyamide, polyimide, polystyrene, polycarbonate, silicone resin, fluorine-based resin (e.g. PTFE, ETFE, and PFA), urethane-based resin, composite materials of polyolefins, polyvinyl chloride, polyester, polyamide, polystyrene, polycarbonate, silicone resin, fluorine-based resin and urethane-based resin, various rubber materials (e.g. latex rubber and silicone rubber), and composite materials in which two or more of the above-mentioned resin materials are combined. Of the above resin materials, for example, it can be more preferable to use the urethane-based resin.

The thickness of the distal coating layer 41 is not particularly limited and is preferably, for example, 5 μm to 500 μm. It should be noted that the distal coating layer 41 is not limited to a one-layer structure and may be configured by laminating a plurality of layers.

The distal coating layer 41 is preferably covered with a hydrophilic coating layer. As a result, the guide wire 10 can be improved in terms of operability as a result of frictional resistance reduction in relation to the wall of the blood vessel into which the guide wire 10 is inserted and the inner wall of the catheter.

The material that forms the hydrophilic coating layer is not particularly limited, and examples of the materials that form the hydrophilic coating layer can include hydrophilic substances consisting of, for example, cellulose-based polymer substance, polyethylene oxide-based polymer substance, maleic anhydride-based polymer substance (e.g. maleic anhydride copolymer such as methyl vinyl ether-maleic anhydride copolymer), acrylamide-based polymer substance (e.g. block copolymer of polyacrylamide and polyglycidylmethacrylate-dimethylacrylamide (PGMA-DMAA)), water-soluble nylon, polyvinyl alcohol, and polyvinylpyrrolidone.

The thickness of the hydrophilic coating layer is not particularly limited and is preferably, for example, 0.1 μm to 100 μm.

Tubular Member

The tubular member 50 is disposed in the first constant outer diameter portion 34 of the first wire 21. The distal portion of the tubular member is in contact with the proximal portion of the distal coating layer 41, and the proximal end of the distal coating layer 41 is in the lumen of the tubular member 50. The proximal portion of the tubular member 50 is fixed to the first wire 21 by a fixing member 51. The proximal portion of the tubular member 50 has a tapered portion 52, which has an outer diameter gradually decreasing toward the proximal side. The fixing member 51, which is positioned closer to the proximal side than the proximal end of the tubular member 50, is formed in a tapered shape so as to be continuous with the tapered portion 52 of the tubular member 50.

The tubular member 50 is preferably, for example, made of metal. Examples of the metal that forms the tubular member 50 include stainless steel, a superelastic alloy, a cobalt-based alloy, precious metals (e.g. gold, platinum, and tungsten), and alloys containing the metals (platinum-iridium alloy).

Proximal Coating Layer

As illustrated in FIG. 1, the proximal coating layer 60 is formed so as to cover at least a part of the outer surface of the second wire 22. The proximal coating layer 60 has an inner layer 61 covering the outer surface of the second wire 22, an outer layer 62 covering the outer surface of the inner layer, and a linear body 63 spirally wound around the outer surface of the outer layer 62.

Examples of the material that forms the inner layer 61 and the outer layer 62 can include a fluorine-based resin (e.g. polytetrafluoroethylene (PTFE) and tetrafluoroethylene-ethylene copolymer (ETFE)). In addition, the inner layer 61 and the outer layer 62 may contain a pigment.

It should be noted that the proximal coating layer 60 is not limited to the configuration described above and may be configured by, for example, one layer.

The linear body 63 is a member that is spirally wound along the circumferential direction of the second wire 22 and has a convex shape from the outer surface of the outer layer 62 toward the outside in the radial direction. The linear body 63 is formed such that adjacent windings are separated from each other. With the linear body 63, the outer surface of the second wire 22 has a plurality of convex portions and concave portions formed between the adjacent convex portions.

The linear body 63 is preferably formed of resin. A fluorine-based resin (e.g. polytetrafluoroethylene (PTFE) and tetrafluoroethylene-hexafluoropropylene copolymer (FEP)) can be used as the resin that forms the linear body 63. In addition, the linear body 63 may contain a pigment.

The linear body 63 is spirally wound around the outer surface of the outer layer 62 by dipping or spotting. As for the dipping method, with a masking tape spirally wound around the part on the outer layer 62 where a concave portion is to be formed, the second wire 22 is immersed in a solution containing the resin forming the linear body 63 and dried, and then the masking tape is removed. As for the spotting method, the resin forming the linear body 63 that is dissolved in a solvent or is in a molten state is linearly extruded onto the outer surface of the outer layer 62 of the second wire 22 that moves in the longitudinal axis direction while rotating. The linear body 63 may be fixed to the outer surface of the outer layer 62 by being wound around the outer surface of the outer layer 62 and then heated to a temperature close to the melting point temperature of the linear body 63. By these methods, the resin is spirally applied to the outer surface of the outer layer 62 of the second wire 22 and the linear body 63 as a convex portion directed radially outward from the outer surface of the outer layer 62 is formed. In a vertical cross-sectional view of the second wire 22, each convex portion has a top portion as the position of the convex portion that protrudes the most to the outside in the radial direction, a distal end portion positioned closer to the distal side than the top portion, and a proximal end portion positioned closer to the proximal side than the top portion. The contour of the outer surface of the convex portion can be a relatively smooth circular arc shape connecting the distal end portion, the top portion, and the proximal end portion. It should be noted that the contour of the outer surface of the convex portion in the vertical cross-sectional view of the second wire 22 is not limited to the circular arc and the contour of the outer surface of the convex portion in the vertical cross-sectional view of the second wire 22 may be, for example, an elliptical arc, a triangle, or a rectangle.

The height of the convex portion, can be, for example, preferably 0.001 mm to 0.100 mm. It should be noted that the height of the convex portion is the length of a perpendicular line drawn from the top portion of the convex portion to the outer surface of the outer layer 62 in the vertical cross-sectional view of the second wire 22.

EXAMPLES

The effects of the disclosure will be described with reference to the following examples and comparative examples. Unless otherwise specified, each operation was performed at room temperature (15° C. to 29° C.).

Example 1

Test Piece Preparation

Two Ni—Ti alloy wires (outer diameter: 0.68 mm to 0.72 mm) were prepared, and the end portions of the wires were solid-phase-joined to each other. As for the composition of the Ni—Ti alloy, Ni was 55% to 56% by weight and the rest of the composition (i.e., 45% to 44%) was Ti. The two wires were disposed in a joining device in an axially aligned state, and each wire was clamped and fixed. Next, the end surfaces of the two wires were brought into pressure contact with each other and the joining device was energized. The two wires were solid-phase-joined by being softened and plastically deformed by the heat generated in the contact portion between the two wires. As for the joined wires, burrs protruding outward in the radial direction of the wire were formed at the contact position of the two wires as a result of the plastic deformation attributable to compression. The burrs were mechanically polished to obtain a wire with a protruding portion having an outer diameter of 0.62 mm to 0.72 mm. The outer diameter was measured using a thickness gauge. The obtained wire was used as a test piece for the following evaluation. In Example 1, the current value at 5 ms from energization initiation was 200 A.

In this example and the comparative examples, the current value at 5 ms from energization initiation was 75 A to 300 A.

Example 2

Two Ni—Ti alloy wires (outer diameter: 0.68 mm to 0.72 mm) were prepared, and the end portions of the wires were solid-phase-joined to each other. As for the composition of the Ni—Ti alloy, Ni was 55% to 56% by weight and the rest of the composition (i.e., 45% to 44%) was Ti. The two wires were disposed in a joining device in an axially aligned state, and each wire was clamped and fixed. Next, the end surfaces of the two wires were brought into pressure contact with each other and the joining device was energized. The two wires were solid-phase-joined by being softened and plastically deformed by the heat generated in the contact portion between the two wires. As for the joined wires, burrs protruding outward in the radial direction of the wire were formed at the contact position of the two wires as a result of the plastic deformation attributable to compression. The burrs were mechanically polished to obtain a wire with a protruding portion having an outer diameter of 0.62 mm to 0.72 mm. The outer diameter was measured using a thickness gauge. The obtained wire was used as a test piece for the following evaluation. In Example 2, the current value at 5 ms from energization initiation was 100 A.

Comparative Example 1

Two Ni—Ti alloy wires (outer diameter: 0.68 mm to 0.72 mm) were prepared, and the end portions of the wires were solid-phase-joined to each other. As for the composition of the Ni—Ti alloy, Ni was 55% to 56% by weight and the rest of the composition (i.e., 45% to 44%) was Ti. The two wires were disposed in a joining device in an axially aligned state, and each wire was clamped and fixed. Next, the end surfaces of the two wires were brought into pressure contact with each other and the joining device was energized. The two wires were solid-phase-joined by being softened and plastically deformed by the heat generated in the contact portion between the two wires. As for the joined wires, burrs protruding outward in the radial direction of the wire were formed at the contact position of the two wires as a result of the plastic deformation attributable to compression. The burrs were mechanically polished to obtain a wire with a protruding portion having an outer diameter of 0.62 mm to 0.72 mm. The outer diameter was measured using a thickness gauge. The obtained wire was used as a test piece for the following evaluation. In Comparative Example 1, the current value at 5 ms from energization initiation was 300 A.

Comparative Example 2

Two Ni—Ti alloy wires (outer diameter: 0.68 mm to 0.72 mm) were prepared, and the end portions of the wires were solid-phase-joined to each other. As for the composition of the Ni—Ti alloy, Ni was 55% to 56% by weight and the rest of the composition (i.e., 45% to 44%) was Ti. The two wires were disposed in a joining device in an axially aligned state, and each wire was clamped and fixed. Next, the end surfaces of the two wires were brought into pressure contact with each other and the joining device was energized. The two wires were solid-phase-joined by being softened and plastically deformed by the heat generated in the contact portion between the two wires. As for the joined wires, burrs protruding outward in the radial direction of the wire were formed at the contact position of the two wires as a result of the plastic deformation attributable to compression. The burrs were mechanically polished to obtain a wire with a protruding portion having an outer diameter of 0.62 mm to 0.72 mm. The outer diameter was measured using a thickness gauge. The obtained wire was used as a test piece for the following evaluation. In Comparative Example 2, the current value at 5 ms from energization initiation was 75 A.

Test Examples

Deformation Amount

Before and after the solid-phase joining, the longitudinal-axis-direction distance between the two clamps fixing the wire was recorded. The difference in inter-clamp distance before and after the solid-phase joining was regarded as the amount of deformation.

Joining Strength Measurement

The joining strength of the test piece including the joint portion was obtained in a tensile test using an autograph (manufactured by Shimadzu Corporation). The test piece was fixed to chucks above and below such that the joint portion was positioned in the middle between the chucks. The upper portion of the test piece was pulled, and the maximum test force until the breaking of the test piece was regarded as the joining strength of the test piece. The distance between the chucks (original reference point distance) was 8 mm, and the test speed was 5 mm/min.

Hardness Measurement

The hardness of the test piece was obtained in a micro pushing test in accordance with International Standard ISO14577-1. After performing resin embedding on the joint surface of the test piece and the part including the vicinity thereof, cutting and polishing were performed to expose a vertical cross section including the central axis of the test piece or the vicinity of the central axis. Using a dynamic ultra-micro hardness tester (DUH-211S, manufactured by Shimadzu Corporation) and in accordance with ISO14577-1 (instrumentation pushing hardness test), the displacement-test force at a time when an indenter was pushed into a predetermined position in the vertical cross section until the test force became 65 μN and the indenter was pulled up after five-second holding was recorded and the pushing hardness (N/mm2) obtained from a load unloading curve was multiplied by 0.0924 to calculate a value converted into a Vickers hardness conversion value (HV*). It should be noted that a triangular pan indenter (inter-ridge angle: 115 degrees, Berkovich-type) was used for the measurement. As for the hardness at the joint surface, a five-point average value and an unbiased standard deviation were obtained to two decimal places with respect to the vertical cross section including the intersection of the central axis of the test piece and the joint surface and the five measurement points were the intersection and two at a position of 0.0625 mm and two at a position of 0.125 mm on the outer side in the radial direction along the joint surface d1 from the intersection.

Particle Size Distribution Measurement

After performing resin embedding on the test piece, cutting and polishing were performed to expose a vertical cross section including the central axis of the test piece or the vicinity of the central axis. In the vertical cross section of the test piece, the 0.075 mm×0.075 mm measurement target region with the intersection of the central axis of the test piece and the joint surface at its center was observed at a magnification of 5000 times using a scanning electron microscope and an image showing the grain boundaries of the crystal grains was obtained using a crystal orientation-grain boundary microstructure automatic analysis device (OIM). The area of the crystal grains in the measurement target region was calculated, and crystal grain size calculation was performed on the assumption that each crystal grain was a true sphere. It should be noted that the crystal grains across the boundary of the measurement target region were included in the calculation. Based on the obtained crystal grain size, a number-based particle size distribution was created at a crystal grain size section of 1 μm.

Table 1 (FIG. 6) shows the amount of deformation, the joining strength, the mode particle size, the frequency of crystal grains having the mode particle size, the frequency of crystal grains having a crystal grain size with a representative diameter of (mode particle size (μm)−1 μm) or more and (mode particle size (μm)+1 μm) or less, the hardness, and the standard deviation of hardness regarding each of Examples 1 and 2 and Comparative Examples 1 and 2. FIGS. 2 to 5 are the number-based particle size distributions of Examples 1 and 2 and Comparative Examples 1 and 2, respectively. The section of the crystal grain size in the particle size distribution was 1 μm, and the representative diameter of the crystal grain size corresponding to the median value of each section was shown on the horizontal axis.

As shown in Table 1 (FIG. 6), in Examples 1 and 2, the joining strength was significantly improved as compared with Comparative Examples 1 and 2. In addition, the joining strength was further improved in Example 1, in which the mode particle size is 2.50 μm or more and the standard deviation of hardness on the joint surface is 10.00 or less.

As described above, the guide wire of the disclosure is high in joining strength. Also anticipated are torque transmission performance improvement and fatigue strength improvement resulting from stress concentration mitigation.

The detailed description above describes embodiments of a guide wire. The invention is not limited, however, to the precise embodiments and variations described. Various changes, modifications and equivalents may occur to one skilled in the art without departing from the spirit and scope of the invention as defined in the accompanying claims. It is expressly intended that all such changes, modifications and equivalents which fall within the scope of the claims are embraced by the claims.

What is claimed is:

1. A guide wire comprising:
   a first wire and a second wire that are solid-phase-joined to each other, the first wire and the second wire being made of a nickel-titanium-based alloy;
   in a section of a crystal grain size of 1 μm in a number-based particle size distribution of crystal grains of a metallographic structure of a joint surface between the first wire and the second wire, a frequency of a mode particle size is 25% or more and a frequency of a representative diameter being (mode particle size (μm)−1 μm) or more and (mode particle size (μm)+1 μm) or less is 60% or more; and
   wherein the section of the crystal grain size is a sectional width used in the number-based particle size distribution of crystal grains, the mode particle size is a representative diameter of a section with a highest frequency in the number-based particle size distribution, and the representative diameter is a median value of each section in the number-based particle size distribution.

2. The guide wire according to claim 1, wherein the mode particle size is 2.50 μm or more.

3. The guide wire according to claim 1, wherein a standard deviation of hardness at the joint surface is 10.00 or less measured in Vickers hardness and the standard deviation is calculated as an unbiased standard deviation based on five measurement points in accordance with ISO 14577-1.

4. The guide wire according to claim 1, wherein the joint surface includes a joint portion protruding radially outward from outer surfaces of the first wire and the second wire.

5. The guide wire according to claim 1, wherein the first wire includes a distal portion disposed on a distal side of the first wire, a first constant outer diameter portion disposed on a proximal side of the distal portion of the first wire, and a first tapered portion disposed between the distal portion of the first wire and the first constant outer portion of the first wire.

6. The guide wire according to claim 5, wherein the second wire includes a second constant outer diameter portion disposed on a distal side of the second wire, a third constant outer diameter portion disposed on a proximal side of the second constant outer diameter portion, and a second tapered portion disposed between the second constant outer diameter portion and the third constant outer diameter portion.

7. The guide wire according to claim 1, further comprising:
an outer diameter of the first wire being different than an outer diameter of the second wire.

8. The guide wire according to claim 1, wherein an outer diameter of the guide wire at a position at 150 mm from a joint surface between the first wire and the second wire to a proximal side of the guide wire is 115% or more than an outer diameter at a 150 mm from the joint surface to a distal side of the guide wire.

9. The guide wire according to claim 1, wherein the mode particle size is 2.5 µm to 5.5 µm.

10. The guide wire according to claim 1, wherein the mode particle size is 2.5 µm to 3.5 µm.

11. A guide wire, the guide wire comprising:
a first wire;
a second wire solid-phase joined to the first wire;
in a section of a crystal grain size of 1 µm in a number-based particle size distribution of crystal grains of a metallographic structure of a joint surface between the first wire and the second wire, a frequency of a mode particle size is 25% or more and a frequency of a representative diameter being (mode particle size (µm)−1 µm) or more and (mode particle size (µm)+1 µm) or less is 60% or more; and
wherein the section of the crystal grain size is a sectional width used in the number-based particle size distribution of crystal grains, the mode particle size is a representative diameter of a section with a highest frequency in the number-based particle size distribution, and the representative diameter is a median value of each section in the number-based particle size distribution.

12. The guide wire according to claim 11, wherein
the first wire and the second wire are made of a nickel-titanium-based alloy; and
the mode particle size is 2.5 µm to 3.5 µm.

13. The guide wire according to claim 11, wherein
the first wire includes a distal portion disposed on a distal side of the first wire, a first constant outer diameter portion disposed on a proximal side of the distal portion of the first wire, and a first tapered portion disposed between the distal portion of the first wire and the first constant outer portion of the first wire; and
the second wire includes a second constant outer diameter portion disposed on a distal side of the second wire, a third constant outer diameter portion disposed on a proximal side of the second constant outer diameter portion, and a second tapered portion disposed between the second constant outer diameter portion and the third constant outer diameter portion.

14. The guide wire according to claim 11, further comprising:
a coil arranged on a distal portion of the first wire, the coil including a spirally wound wire around the first wire along a circumferential direction of the first wire;
a distal coating layer of a resin material on the distal portion of the first wire including the coil; and
a tubular member arranged proximal to the distal coating layer of the first wire and to a distal side of the joint surface of the first wire and the second wire.

15. The guide wire according to claim 14, further comprising:
a proximal coating layer covering at least a part of an outer surface of the second wire.

16. A method of forming a guide wire, the method comprising:
solid-phase joining a first wire and a second wire to each other such that in a section of a crystal grain size of 1 µm in a number-based particle size distribution of crystal grains of a metallographic structure of a joint surface between the first wire and the second wire, a frequency of a mode particle size is 25% or more and a frequency of a representative diameter being (mode particle size (µm)−1 µm) or more and (mode particle size (µm)+1 µm) or less is 60% or more, the section of the crystal grain size being a sectional width used in the number-based particle size distribution of crystal grains, the mode particle size being a representative diameter of a section with a highest frequency in the number-based particle size distribution, and the representative diameter being a median value of each section in the number-based particle size distribution.

17. The method according to claim 16, further comprising:
solid-phase joining the first wire and the second wire to each other by friction joining, room-temperature pressure joining, high-temperature pressure joining, explosive joining, or electromagnetic pulse joining.

18. The method according to claim 16, wherein the solid-phase joining of the first wire and the second wire to each other comprises:
bringing a surface of the first wire into pressure contact with a surface of the second wire in an axial direction; and
inputting heat to the surfaces of the first wire and the second wire that are in contact with each other.

19. The method according to claim 18, further comprising:
compressing the first wire and the second wire in a longitudinal direction, and wherein the first wire and the second wire extrude radially outward as a result of the compression.

20. The method according to claim 19, further comprising:
mechanically polishing the first wire and the second wire where the first wire and the second wire extrude radially outward.

* * * * *